United States Patent
Hu et al.

(10) Patent No.: US 11,177,470 B2
(45) Date of Patent: Nov. 16, 2021

(54) COMPOSITE COATING SYSTEMS AND METHODS FOR LITHIUM METAL ANODES IN BATTERY APPLICATIONS

(71) Applicant: SES Holdings Pte. Ltd., Singapore (SG)

(72) Inventors: Qichao Hu, Somerville, MA (US); Jiapeng Xu, Newton, MA (US); Xiaorui Chen, Watertown, MA (US)

(73) Assignee: SES Holdings Pte. Ltd., Singapore (SG)

( * ) Notice: Subject to any disclaimer, the term of this patent is extended or adjusted under 35 U.S.C. 154(b) by 813 days.

(21) Appl. No.: 15/085,421

(22) Filed: Mar. 30, 2016

(65) Prior Publication Data

US 2016/0293943 A1    Oct. 6, 2016

Related U.S. Application Data

(60) Provisional application No. 62/140,143, filed on Mar. 30, 2015.

(51) Int. Cl.
*H01M 50/449* (2021.01)
*H01M 50/451* (2021.01)
(Continued)

(52) U.S. Cl.
CPC .......... *H01M 4/366* (2013.01); *H01M 4/134* (2013.01); *H01M 4/1395* (2013.01); *H01M 4/382* (2013.01); *H01M 4/622* (2013.01); *H01M 4/628* (2013.01); *H01M 4/661* (2013.01); *H01M 10/052* (2013.01); *H01M 10/0525* (2013.01);
(Continued)

(58) Field of Classification Search
None
See application file for complete search history.

(56) References Cited

U.S. PATENT DOCUMENTS

| 2,688,006 A | 8/1954 | Steinman |
| 3,640,829 A | 2/1972 | Elton |

(Continued)

FOREIGN PATENT DOCUMENTS

| CN | 103296240 A | 9/2013 |
| CN | 103794755 A | 5/2014 |

(Continued)

OTHER PUBLICATIONS

International Search Report and Written Opinion issued by the U.S. Patent and Trademark Office as International Searching Authority for International Application No. PCT/US16/24968 dated Jul. 1, 2016 (11 pages).

(Continued)

*Primary Examiner* — Yoshitoshi Takeuchi
(74) *Attorney, Agent, or Firm* — Downs Rachlin Martin PLLC

(57) ABSTRACT

A battery structure with a cathode, an electrolyte, and a lithium metal anode is coated with a composite coating including a mixture of a polymer and a reinforcing fiber. The cathode and the lithium metal are held apart by a porous separator soaked with the electrolyte. The reinforcing fiber is dispersed in the polymer matrix. The composite coating is porous or non-porous. The composite coating conducts lithium ions. The reinforcing fiber is chemically functionalized.

26 Claims, 4 Drawing Sheets

(51) Int. Cl.
*H01M 50/454* (2021.01)
*H01M 50/457* (2021.01)
*H01M 50/489* (2021.01)
*H01M 50/491* (2021.01)
*H01M 50/494* (2021.01)
*H01M 50/497* (2021.01)
*H01M 4/36* (2006.01)
*H01M 4/1395* (2010.01)
*H01M 10/052* (2010.01)
*H01M 4/134* (2010.01)
*H01M 4/38* (2006.01)
*H01M 4/62* (2006.01)
*H01M 4/66* (2006.01)
*H01M 10/0525* (2010.01)
*H01M 10/0565* (2010.01)
*H01M 4/02* (2006.01)

(52) U.S. Cl.
CPC .. *H01M 10/0565* (2013.01); *H01M 2004/027* (2013.01); *H01M 2300/0065* (2013.01); *H01M 2300/0082* (2013.01)

(56) References Cited

U.S. PATENT DOCUMENTS

| | | | |
|---|---|---|---|
| 5,427,872 A | 6/1995 | Shen et al. | |
| 5,648,187 A | 7/1997 | Skotheim | |
| 5,824,434 A | 10/1998 | Kawakami et al. | |
| 6,025,094 A | 2/2000 | Visco et al. | |
| 6,723,140 B2 | 4/2004 | Chu et al. | |
| 6,733,924 B1 | 5/2004 | Skotheim et al. | |
| 6,737,197 B2 | 5/2004 | Chu et al. | |
| 6,797,428 B1 | 9/2004 | Skotheim et al. | |
| 6,911,280 B1 | 6/2005 | De Jonghe et al. | |
| 7,081,142 B1 | 7/2006 | Carlson | |
| 7,112,389 B1 | 9/2006 | Arora et al. | |
| 7,247,408 B2 | 7/2007 | Skotheim et al. | |
| 7,282,295 B2 | 10/2007 | Visco et al. | |
| 8,105,717 B2 | 1/2012 | Skotheim et al. | |
| 8,114,171 B2 | 2/2012 | Visco et al. | |
| 8,197,971 B2 | 6/2012 | Skotheim et al. | |
| 8,501,339 B2 | 8/2013 | Visco et al. | |
| 8,603,682 B2 | 12/2013 | Yu et al. | |
| 8,617,748 B2 | 12/2013 | Mikhaylik et al. | |
| 8,623,557 B2 | 1/2014 | Skotheim et al. | |
| 8,728,661 B2 | 5/2014 | Skotheim et al. | |
| 8,753,771 B2 | 6/2014 | Skotheim et al. | |
| 8,778,522 B2 | 7/2014 | Visco et al. | |
| 8,828,580 B2 | 9/2014 | Visco et al. | |
| 9,065,149 B2 | 6/2015 | Skotheim et al. | |
| 9,368,775 B2 | 6/2016 | Visco et al. | |
| 9,397,342 B2 | 7/2016 | Skotheim et al. | |
| 9,653,735 B2 | 5/2017 | Skotheim et al. | |
| 2002/0012846 A1* | 1/2002 | Skotheim | H01M 4/387 429/231.95 |
| 2005/0042515 A1 | 2/2005 | Hwang et al. | |
| 2005/0053840 A1* | 3/2005 | Jo | H01M 2/162 429/247 |
| 2006/0191794 A1 | 8/2006 | Jarvis | |
| 2008/0057386 A1 | 3/2008 | Visco et al. | |
| 2009/0155676 A1* | 6/2009 | Zhamu | H01M 2/166 429/129 |
| 2011/0104571 A1 | 5/2011 | Zhamu et al. | |
| 2011/0165462 A1* | 7/2011 | Zhamu | H01M 4/134 429/223 |
| 2011/0177398 A1 | 7/2011 | Affinito et al. | |
| 2012/0003532 A1 | 1/2012 | Badding et al. | |
| 2013/0017441 A1 | 1/2013 | Affinito et al. | |
| 2013/0059202 A1 | 3/2013 | Nishimura et al. | |
| 2013/0236764 A1 | 9/2013 | Hu et al. | |
| 2013/0273435 A1* | 10/2013 | Leitner | H01M 10/0565 429/309 |
| 2014/0220439 A1 | 8/2014 | Badding et al. | |
| 2015/0037651 A1 | 2/2015 | Huang | |
| 2015/0064602 A1 | 3/2015 | Lee et al. | |
| 2015/0318552 A1 | 11/2015 | Skotheim et al. | |

FOREIGN PATENT DOCUMENTS

| | | |
|---|---|---|
| CN | 104124414 A | 10/2014 |
| JP | 2005142156 A | 6/2005 |
| WO | 2013049460 A1 | 4/2013 |

OTHER PUBLICATIONS

Lee, et al., "A Simple Composite Protective Layer Coating that Enhances the Cycling Stability of Lithium Metal Batteries," J. Power Sources, vol. 284, pp. 103-108 (2015).
Tung, et al., "A Dendrite-Suppressing Composite Ion Conductor from Aramid Nanofibers," Nature Communications, vol. 6, pp. 1-7 (2015).
Villaluenga, et al., "Cation Only Conduction in New Poiymer-SiO$_2$ Nanohybrids: Na$^+$ Electrolytes," J. Mater. Chem. A., vol. 1, pp. 8348-8352 (2013).
Yang, et al. "Dispersions of Aramid Nanofibers: A New Nanoscale Building Block," ACS Nano, vol. 5, No. 9, pp. 6945-6954 (2011).
Zheng, et al., "Interconnected Hollow Carbon Nanospheres for Stable Lithium Metal Anodes," Nature Nanotechnology, Advanced Online Publication, vol. 9, No. 8, 6 pgs. (2014).
Song, et al., "Ionomer-Liquid Electrolyte Hybrid Ionic Conductor for High Cycling Stability of Lithium Metal Electrodes," Scientific Reports, vol. 5, 9 pgs. (2015).
R. Brdicka et al., "Surface area and pore size determination", Modern Methods of Heterogeneous Catalysis Research, Jan. 1, 2004, Weinheim Handbook of Porous Solids.
"A Basic Guide to Particle Characterization", Malvern Instruments Worldwide—White Paper, May 2, 2012, pp. 1-26.

* cited by examiner

COMPOSITE COATING SYSTEMS AND METHODS FOR LITHIUM METAL ANODES IN BATTERY APPLICATIONS

INCORPORATION BY REFERENCE

This application claims benefit under 35 U.S.C. 119(e) to U.S. Provisional Patent Application No. 62/140,143, filed on Mar. 30, 2015, the entirety of which is explicitly incorporated by reference herein.

All patents, patent applications and publications cited herein are hereby incorporated by reference in their entirety. The disclosures of these publications in their entireties are hereby incorporated by reference into this application in order to more fully describe the state of the art as known to those skilled therein as of the date of the invention described herein.

TECHNICAL FIELD

The disclosure relates generally to rechargeable batteries, and more specifically, to rechargeable lithium batteries, and the use of composite coatings with improved properties in rechargeable lithium batteries.

BACKGROUND

This invention relates to the field of batteries, particularly to the type of lithium-based batteries. It is well known that the formation of dendritic lithium during charging-discharging is a main reason that hurdles battery performance.

Lithium metal anodes are being developed for use in batteries with higher energy storage density than existing lithium ion batteries. Lithium metal has a specific capacity (3,860 mAh g−1) and the lowest anode potential of all currently available anodes (−3.05 V vs. standard hydrogen electrode). Lithium is a reactive metal and during battery operation lithium is being routinely deposited and removed. However, as fresh lithium is deposited, it may not grow in a uniform fashion. Instead the lithium metal can form a branch-like or mossy structure, commonly referred to as "dendrite growth". The formation of this type of lithium is highly undesired, as it causes a non-uniform lithium surface which leads to uneven lithium deposit. As the dendrites grow, they become longer in size and, if they eventually reach the anode, it will short the battery circuit, which causes failure. In addition, reactions of lithium anodes with the electrolyte may result in the formation of resistive film barriers on the anode. This film barrier increases the internal resistance of the battery and lowers the amount of current capable of being supplied by the battery at the rated voltage.

Previous efforts to suppress lithium dendritic growth include the use of physical barriers, such as physical barriers including ion conducting polymer and physical barriers including solid electrolytes. Although solid electrolytes have been able to reduce dendrite growth, they are poor lithium ion conductors at room temperature and require operation at elevated temperatures. In addition, improvements observed with previous physical barriers are limited to operation at relatively low current densities (e.g., <1 mA-cm$^2$), which is not suitable for high energy density battery operation.

SUMMARY

An engineered composite coating on the lithium metal surface is described to suppress or even prevent lithium dendritic formation. With reduced or no dendrite formation, the coating subsequently results in an even lithium plating and reduces or eliminates the chance of dendrites causing shorting which improves the cycle life of lithium batteries. The composite coating may include a mixture of polymer and reinforcing fibers.

In one aspect, a battery includes a cathode, a lithium metal anode, an electrolyte between the cathode and the anode, and (optionally) a separator immersed in the electrolyte between the cathode and the anode. A composite material coating is applied over the lithium metal anode to suppress or prevent lithium dendrite from forming.

In one or more embodiments, the composite material includes a lithium ion conducting organic polymer and a reinforcing fiber. In one or more embodiments, the fibers can be or can include organic fiber(s) or inorganic fiber(s), or any combinations thereof. In one or more embodiments, the fibers are inorganic. In one or more embodiments, the fibers are organic. In one or more embodiments, the fibers are dispersed in the polymer matrix. The composite material can optionally also include particles. In one or more embodiments, the fiber and the particles are dispersed in the polymer matrix. The reinforcing fiber can include functional moieties that improve the fiber's ion-conducting capacity and interaction with the matrix polymer.

One aspect described herein relates to a lithium metal anode. The lithium metal anode includes a current collector and a composite coating disposed over the current collector. The composite coating includes a mixture of a polymer and reinforcing fibers, where the reinforcing fibers are dispersed in a matrix of the polymer.

In one or more embodiments, the lithium metal anode further includes a lithium metal layer disposed between the current collector and the composite coating.

In one or more embodiments, the polymer includes a lithium ion conducting polymer.

In one or more embodiments, the polymer includes a binder.

In one or more embodiments, the polymer is selected from the group consisting of poly(methyl methacrylate), poly(hexyl methacrylate), polystyrene, poly(tetrafluoroethylene), polyethylene glycol, polyacrylonitrile, poly(vinylpyridine), poly(lithium 2-acrylamido-2-methyl-1-propanesulfonate), aromatic polyamide, polyvinylpyrrolidone, poly(vinyl acetate) and poly(N-isopropylacrylamide), and any blends or copolymers thereof.

In one or more embodiments, the current collector includes a copper layer.

In one or more embodiments, the fibers are selected from the group consisting of ceramic, organic, or lithium-based fibers. In one or more embodiments, the fibers are inorganic.

In one or more embodiments, the fibers have a length (or at least one dimension) in the range of about 1-100 nm, 100-1000 nm, or 1000-5000 nm.

In one or more embodiments, the fiber load of the composite is in the range of about 1% wt to 99% wt, or about 50% wt to 99% wt. In one or more embodiments, the fiber load of the composite is in the range of about 1% wt to 10% wt.

In one or more embodiments, the fibers are chemically functionalized. In one or more embodiments, the fibers are chemically functionalized, for example, to improve wettability or to impart lithium ion transport capability to the fiber. In one or more embodiments, the fibers are functionalized to improve lithium ion transport capability of the fiber (e.g., to increase lithium ion transport through the composite coating).

In one or more embodiments, the functionality includes an imide anion, and/or the functionality includes a polyalkoxy moiety. In one or more embodiments, some fibers include one kind of functionality (e.g., polyalkoxy moiety) and some fibers include another kind of functionality (e.g., imide anion).

In one or more embodiments, the composite coating further includes a reinforcing nanoparticle component (e.g., in addition to the reinforcing fibers).

In one or more embodiments, the composite coating is porous. In one or more embodiments, an average pore size of the composite coating is between about 25 nm and 500 nm (e.g., larger than the average diameter of a lithium dendrite tip). In one or more embodiments, the average pore size of the composite coating is equal to or smaller than about 25 nm (e.g., smaller than the average diameter of a lithium dendrite tip).

In one or more embodiments, the pores are created by doping a mixture of the polymer and the reinforcing fiber (e.g., and optionally reinforcing particles) with a salt (e.g., imide salt, e.g., LiFSI salt) prior to the coating. In one or more embodiments, the salt is soluble in the electrolyte of the battery. In one or more embodiments, the salt is insoluble in the polymer and the reinforcing fiber.

In one or more embodiments, the composite coating is porous, where one or both of the polymer and the fiber is non-ionically conductive. In one or more embodiments, the composite coating is porous, where one or both of the polymer and the fiber is ionically conductive.

In one or more embodiments, the composite coating is non-porous. In one or more embodiments, the composite coating has a roughness on the order of 0.2 µm. In one or more embodiments, the composite coating is non-porous, where the composite coating is ionically conductive, where one or both of the polymer and the fiber is ionically conductive. In one or more embodiments, the composite coating has an ionic conductivity greater than about 1 mS/cm$^2$. In one or more embodiments, the composite coating has a modulus greater than about 6 GPa.

In one or more embodiments, the composite layer can protect the lithium metal anode at high current densities, e.g., current densities greater than 3 mA-cm$^2$. In one or more embodiments, the composite layer is physically robust and chemically stable.

In another aspect, a lithium metal anode includes a current collector; and a composite coating disposed over the current collector, the composite coating including a mixture of a lithium ion conducting polymer and a reinforcing component selected from functionalized fibers and nanoparticles, wherein a functional group of the functionalized fibers includes a lithium ion transport functional group.

In one or more embodiments, the lithium metal anode also includes a lithium metal layer disposed between the current collector and the composite coating.

In one or more embodiments, the functionality includes an imide anion, and/or the functionality includes a polyalkoxy moiety. In one or more embodiments, some fibers include one kind of functionality (e.g., polyalkoxy moiety) and some fibers include another kind of functionality (e.g., imide anion).

In one or more embodiments, the polymer is selected from the group consisting of poly(methyl methacrylate), poly(hexyl methacrylate), polystyrene, poly(tetrafluoroethylene), polyethylene glycol, polyacrylonitrile, poly(vinylpyridine), poly(lithium 2-acrylamido-2-methyl-1-propanesulfonate), aromatic polyamide, polyvinylpyrrolidone, poly(vinyl acetate), and poly(N-isopropylacrylamide), and any blends or copolymers thereof.

In one or more embodiments, the current collector includes a copper layer.

In one or more embodiments, the reinforcing component is selected from the group consisting of ceramic, organic or lithium-based materials. In one or more embodiments, the reinforcing component is inorganic. In one or more embodiments, the reinforcing component includes a mixture of organic and inorganic components.

In one or more embodiments, the reinforcing component includes nanoparticles. In one or more embodiments, the nanoparticles have a diameter in the range of 5 nm to 5000 nm.

In one or more embodiments, the reinforcing component load of the composite is in the range of about 1 wt % to 99 wt %, 1 wt % to 10 wt %, 5 wt % to 15 wt %, 10 wt % to 25 wt %, 20 wt % to 40 wt %, 30 wt % to 55 wt %, 50 wt % to 80 wt %, 55 wt % to 90 wt %, 75 wt % to 99 wt %. In one or more embodiments, the reinforcing component includes both fibers and particles, where the amount by weight of the fibers and the particles may be the same or different.

In one or more embodiments, the composite coating is porous. In one or more embodiments, the composite coating is non-porous.

In another aspect, a lithium ion battery includes a cathode, a lithium metal anode substantially as described herein or according to one or more of the preceding embodiments or aspects; and a liquid electrolyte.

In one or more embodiments, the cathode and anode are held apart by a porous separator soaked with the liquid electrolyte that prevents electrical contact between the cathode and the anode while allowing ion conduction between the cathode and the anode.

Another aspect described herein relates to a method of preparing a lithium metal anode battery. The method includes mixing a polymer with a reinforcing component (e.g., reinforcing fiber) and a salt to form a composite coating. The salt is insoluble in the polymer and the reinforcing component. The method includes coating the composite coating onto a lithium metal anode. The method includes assembling the battery by adding a porous separator, a cathode, and an electrolyte. The salt is soluble in the electrolyte. Once the battery is assembled, the salt dissolves in the electrolyte, leaving pores in the composite coating.

Elements of embodiments described with respect to a given aspect of the invention may be used in various embodiments of another aspect of the invention. For example, it is contemplated that features of dependent claims depending from one independent claim can be used in apparatus and/or methods of any of the other independent claims.

BRIEF DESCRIPTION OF THE DRAWINGS

The invention is described with reference to the following figures, which are presented for the purpose of illustration only and are not intended to be limiting.

DETAILED DESCRIPTION OF THE INVENTION

Some embodiments disclosed herein relate to batteries, in particular rechargeable (secondary) batteries with a lithium metal anode. The lithium metal anode may include a current collector and a composite coating layer coated on the current collector. The composite coating layer may include a mixture of a polymer and a reinforcing fiber. The reinforcing fiber may be dispersed in the polymer matrix. The polymer may serve as a binder that holds the reinforcing fiber in place. The composite coating inhibits or reduces lithium dendrite growth, thereby improving the cycle life of the battery. The composite coating layer may be coated on the current collector using various coating methods. The composite coating layer may be porous or non-porous. The fibers may be chemically functionalized to impart desired characteristics to the fibers.

The composite coating layer may conduct lithium ions. The polymer and/or the reinforcing fiber may conduct lithium ions. The polymer and/or the reinforcing fiber may be non-lithium ion conducting. The composite coating may include pores that allow transport of lithium ions. The pores may be created by doping a mixture of the polymer and the reinforcing fibers with a salt (e.g., imide salt) prior to coating the composite mixture on the lithium anode. The salt is soluble in the electrolyte of the battery but is insoluble in the polymer and the reinforcing fibers. Once the battery is assembled, the salt dissolves in the electrolyte, leaving pores in the composite coating.

The reinforcing fibers may be organic or inorganic. The reinforcing fibers may include a mixture of organic and inorganic fibers. The polymer matrix may include reinforcing fibers and reinforcing particles dispersed therein.

In one or more embodiments, physically robust, chemically stable, and fast Li ion conductive layers that can protect Li metal electrodes at high current densities (e.g., current densities greater than 3 mA-cm$^2$) are described. In one or more embodiments, these physically robust layers are composite material coatings. The composite material coating is applied over the lithium metal anode to suppress or prevent lithium dendrites from forming. The composite material is of high strength, so that it is capable of resisting dendritic formation; however, it is also flexible so that it is capable of accommodating changes of anode volume during charge and discharge without fracture or failure. Lastly, the composite material has high lithium ion conductivity (e.g., greater than about 1 mS/cm$^2$) and maintains a low impedance to permit rapid lithium ion diffusion during charge and discharge.

Figure 1:
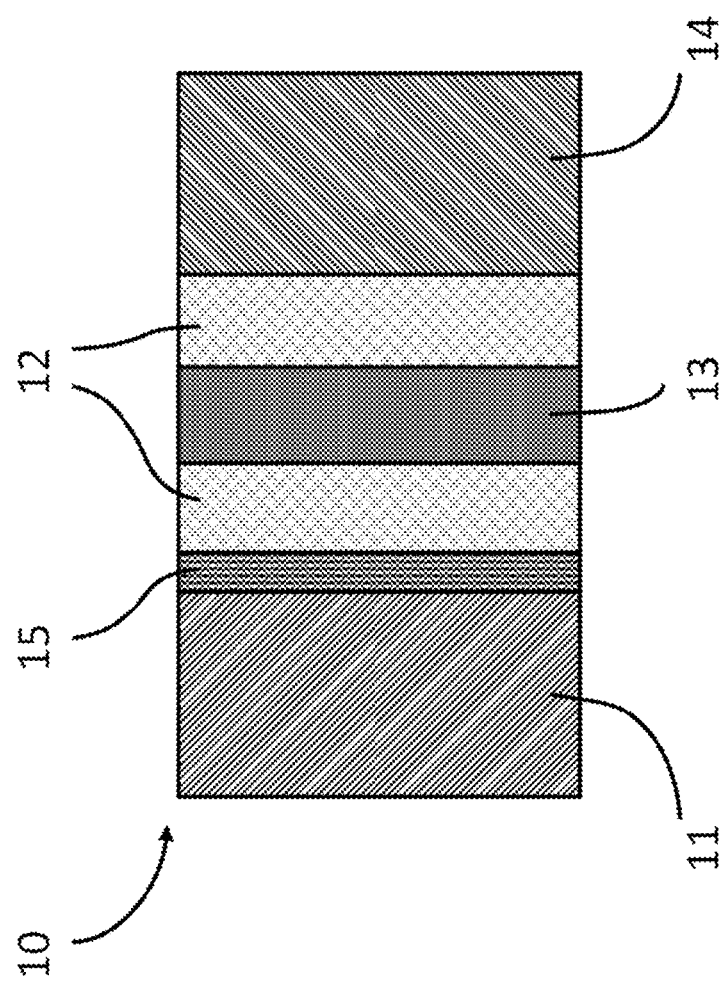
FIG. 1 is a schematic cross-sectional diagram of a battery design, according to some aspects of the present disclosure.

FIG. 1 shows a schematic for the battery construction, in accordance with some embodiments discussed herein.

FIG. 1 illustrates the main components of a lithium ion battery 10 design. The lithium ion battery 10 includes a lithium metal anode 11, a cathode 14, an electrolyte 12, which is disposed between the cathode and the anode, and an optional which is immersed in the electrolyte. The composite coating 15 is applied directly over the anode, located between the anode and the electrolyte. In one or more embodiments, the lithium ion battery 10 is assembled according to the following procedure: a lithium metal anode 11 is coated by the composite coating 15; then the coated anode, a separator 13, and a cathode 14, are place in a pouch; an electrolyte 12 is then added into the pouch and then the pouch is sealed.

In one or more embodiments, the anode 11 of the present invention includes lithium metal as the anode active material. In one or more embodiments, the first anode active layer of the anode is lithium metal. In one or more embodiments, the anode is a lithium metal foil pressed on a current collector such as a copper foil or mesh. In one or more embodiments, the anode is a current collector having a vapor-deposited lithium layer and lithium is subsequently plated on it during the first charge of the battery.

In one or more embodiments, the cathode 14 is a high voltage cathode. In one or more embodiments, the cathode 14 (e.g., Lithium Cobalt Oxide cathode, Nickel Cobalt Manganese cathode) is electrochemically stable at or above 4.4V. In one or more embodiments, the cathode (e.g., Nickel-rich cathode) is a high voltage cathode electrochemically stable at or above 4.5V.

In one or more embodiments, the battery 10 includes at least one surface in contact with the electrolyte 12, the surface including aluminum, aluminum alloy, or stainless steel. In one or more embodiments, the battery 10 includes an aluminum containing cathode current collector.

In one or more embodiments, the lithium metal may be in the form of a lithium metal foil or a thin lithium film (e.g., having a thickness between about 2 to 200 microns) that has been deposited on a substrate. In one or more embodiments, if desirable for the electrochemical properties of the cell, the lithium metal may be in the form of a lithium alloy such as, for example, a lithium-tin alloy or a lithium-aluminum alloy.

In one or more embodiments, the thickness of the lithium layer may vary from about 2 to 200 microns. The choice of the thickness of the lithium layer may depend on cell design parameters such as the excess amount of lithium desired, cycle life, and the thickness of the cathode electrode. In one or more embodiments, the thickness of the first anode active layer is in the range of about 2 to 100 microns. In one or more embodiments, the thickness of the first anode active layer is in the range of about 2 to 5 microns or about 2 to 10 microns. In one or more embodiments, the thickness of the first anode active layer is in the range of about 5 to 50 microns. In one or more embodiments, the thickness of the first anode active layer is in the range of about 5 to 25 microns. In one or more embodiments, the thickness of the first anode active layer is in the range of about 10 to 25 microns. In one or more embodiments, the thickness of the first anode active layer is in the range of about 75 to 125 microns. In one or more embodiments, the thickness of the first anode active layer is in the range of about 100 to 150 microns. In one or more embodiments, the thickness of the first anode active layer is in the range of about 125 to 175 microns. In one or more embodiments, the thickness of the first anode active layer is in the range of about 150 to 200 microns.

The battery system may also include a composite coating layer 15 disposed over the anode 11 and separating the anode 11 from contact with the electrolyte 12. The function of the composite coating layer 15 is to suppress or prevent the lithium dendrites from forming during the battery operation. The composite coating layer 15 may form a matrix including one or more polymer components and one or more reinforcing fiber components. In one or more embodiments, by incorporating ceramic fibers into polymer matrices, for example, it is possible to acquire a desired combination of properties from all component materials to some extent. In one or more embodiments, the porosity of the composite coating is controlled using the polymer as the binding phase. In one or more embodiments, the dimensional stability of the fiber network of the composite coating layer 15 is improved by using the polymer as the binding phase.

In one or more embodiments, the composite coating layer 15 forms a matrix including an ion conducting polymer and a reinforcing fiber. In one or more embodiments, the polymer can form a matrix that fills the voids between the fibers. In one or more embodiments, the polymer forms a matrix that fills the voids between the fibers, where the fibers are ion conductive, and where the fibers isolate the anode from the electrolyte. In one or more embodiments, the composite coating layer 15 can be non-porous. In one or more embodiments, the composite coating layer 15 has a surface roughness that is +/−0.2 μm. In one or more embodiments, the term "non-porous" in reference to the composite coating layer 15 indicates that the composite coating layer 15 prevents the electrolyte from contacting the lithium metal anode layer 11 (e.g., the composite coating layer 15 does not have pores for the electrolyte to diffuse through). In one or more embodiments, the non-porous composite coating layer 15 is ionically conductive. In one or more embodiments, one or both of the polymer and the fiber is ionically conductive. In one or more embodiments, the polymer is ionically conductive and the fiber is not ionically conductive. In one or more embodiments, the polymer is not ionically conductive, and the fiber is ionically conductive. In one or more embodiments, the polymer and the fiber are both ionically conductive, where the ionic conductivity of the polymer and the fiber may be the same or different.

In one or more embodiments, the composite coating layer 15 forms a matrix including a polymer binder and a reinforcing fiber. In one or more embodiments, the use of polymers as binders to hold the fibers in place permits the composite coating to retain voids/porosity throughout. In one or more embodiments, the pore size of the composite coating layer 15 should be smaller than Li dendrite in size, in order to suppress the dendrite growth. In one or more embodiments, the average pore size of the composite coating layer 15 is less than about 25 nm (e.g., less than an average diameter of a Li dendrite tip).

The polymer component can serve as a physical barrier to dendrite formation, while the fibers can reinforce and strengthen the mechanical integrity of the composite coating layer 15. Thus, in one or more embodiments, while the organic polymer is sufficiently compliant so that it can accommodate the volume change of the lithium anode during electrochemical cycling without fracture, the fiber provides mechanical strength to maintain the integrity of the coating and prevent outward growth of lithium dendrites from the lithium anode surface. In one or more embodiments, the composite coating layer 15 is made from an organic polymer and a ceramic fiber.

In one or more embodiments, the composite coating layer 15 is porous. In one or more embodiments, a salt (e.g., lithium bis(fluorosulfonyl)imide) is added to a polymer matrix and fiber solution to create a porous composite coating layer 15. The solution may be stirred for a sufficient time period (e.g., 24 hours) to allow the solution to be coated (e.g., spin-cast, spray coated, dip coated, roll to roll coated, etc.) onto the anode. The solution is then coated (e.g., spin-cast, spray coated, dip coated, roll to roll coated, etc.) onto the anode. The salt (e.g., lithium bis(fluorosulfonyl) imide) may be soluble in the electrolyte (e.g., dimethoxyethane (DME)). Once the electrolyte is added to the cell, the salt (e.g., lithium bis(fluorosulfonyl)imide) may dissolve in the electrolyte (where the polymer and the fibers are is insoluble in the electrolyte) and leave pores behind.

While not being bound by any particular mode of operation, theoretical work predicted a modulus of greater than 6 GPa is needed to suppress Li dendrite growth. That mechanical performance is generally too high for most, if not all, pure polymers. In one or more embodiments, composite coating layers having a modulus greater than 6 GPa are provided.

Figures 2A, 2B:
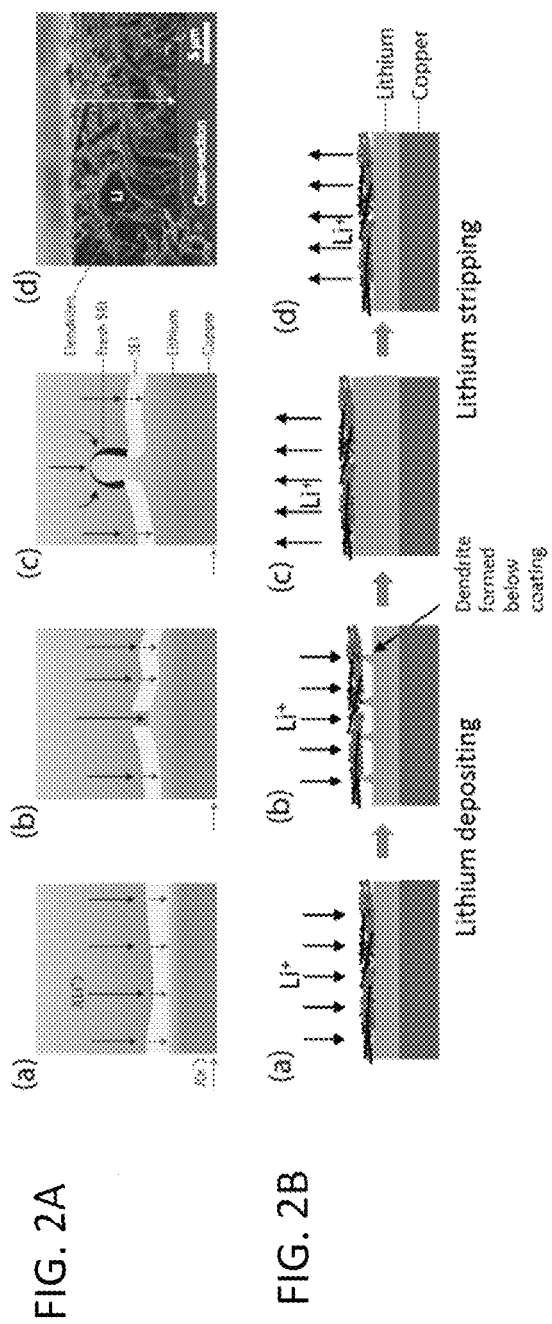
FIG. 2A is a schematic illustration of lithium dendrite formation during electrochemical cycling.
FIG. 2B is a schematic illustration of the operation of the composite layer anode coating, according to some aspects of the present disclosure.

The process of lithium dendritic grown is illustrated in FIG. 2A. FIG. 2A(a) shows a copper current collector, a thin layer of lithium, and a solid-electrolyte interphase (SEI) layer coating the lithium metal layer at the start of charging. FIGS. 2A(b)-(c) show lithium metal deposition during electrochemical cycling. The SEI is in contact with the electrolyte that contains Li ions. During cycling as shown in FIG. 2A(b), lithium metal is deposited and the lithium grows unevenly, leading to a break or disruption of the SEI layer that exposes the lithium metal layer to the electrolyte. Lithium then deposits rapidly, as is shown in FIG. 2A(c), growing through and above the SEI layer. A new SEI layer will eventually form, however, the added SEI surface area increases impedance. FIG. 2A(d) is a photograph of dendrites formed on the lithium anode.

The operation of the anode composite coating layer during lithium ion cycling is illustrated by reference to FIG. 2B. FIG. 2B(a) shows a copper current collector and a composite anode layer according to one or more embodiments. During cycling as shown in FIG. 2B(b), lithium metal is deposited and the lithium grows unevenly on the anode surface. However, unlike the scenario shown in FIG. 2A, the composite coating prevents the further upward growth and disruption of the composite coating layer, so that the lithium deposits below the composite coating layer, without exposure of the lithium metal layer to the electrolyte, as shown in FIG. 2B(c). On discharge, lithium passes through the composite coating as shown in FIG. 2B(d).

The composite coating layer 15 includes one or more of the following features. In one or more embodiments, the composite coating is physically stable throughout the lifetime of the battery. In one or more embodiments, the composite coating layer is chemically stable throughout the lifetime of the battery. In one or more embodiments, the composite coating layer is both physically and chemically stable throughout the lifetime of the battery. In one or more embodiments, the physical stability requirements are such that the composite coating layer can have sufficient mechanical strength in order to maintain its integrity and inhibit the dendrite growth. In one or more embodiments, the composite coating layer can retain its original shape and location during battery operation (e.g., the composite coating does not become deformed during battery operation). In one or more embodiments, the composite coating layer is sufficiently robust that it does not form pinholes, tears, wrinkles, or becomes damaged during battery operation. In one or more embodiments, in terms of chemical stability, the composite coating layer components can withstand the chemical attack from the electrolyte and applied voltage and current during operation. In one or more embodiments, the components of the composite coating layer should not degrade or react with each other or with the other battery components. In one or more embodiments, the components of the composite coating layer cannot be dissolved during usage. In one or more embodiments, chemical stability is defined as lack of (or minimal presence of) undesired reactions between the composite coating layer and the electrolyte.

In one or more embodiments, the composite coating layer is porous. In one or more embodiments, the composite coating layer has a pore size in the order of sub-micrometer level, e.g., up to about 500 nm. In one or more embodiments, the pore size is in the range of about 20 nm to 100 nm. In one or more embodiments, the pore size in on the order of (or smaller than) a Li dendrite tip dimension. The average pore size of the Li dendrite tip is about 25 nm. In one or more embodiments, the porosity of the composite coating layer can be larger than the Li dendrite tip diameter (e.g., larger than about 25 nm) because the composite coating layer has a certain thickness to it, and the tortuosity of the coating pores prevents the growth and penetration of the Li dendrite through the layer. In one or more embodiments, composite coating layers with larger pore sizes, including pore sizes up to about 100 nm, 150 nm, 200 nm, 250 nm, 300 nm, 350 nm, 400 nm, 450 nm, or 500 nm, can be effective due to the thickness of the composite coating layer.

Pore size on this level (e.g., about 25 nm to 500 nm) provides solvent filled passageways for promoting lithium ion transport, while discouraging dendritic growth. This is because the lithium dendrite is observed to have tips in the nanometer range. In one or more embodiments, if the pores in the composite coating layer have a diameter that is smaller than the diameter of the dendrite tip, during lithium deposition process, the dendrites will not grow past the coating and will instead fill the surrounding void space below the coating, for example, as shown in FIG. 2B.

One or more embodiments discussed herein relates to methods for selecting appropriate materials for the composite coating layer. One or more embodiments discussed herein relates to methods for selecting appropriate combinations of materials, including selecting appropriate quantities of each material, for the composite coating layer. In one or more embodiments, the composite coating layer exhibits high mechanical strength, ionic conductivity (with the existence of the liquid electrolyte), low swelling degree (e.g., the composite coating layer remains immiscible with the liquid electrolyte during operation), and good physical/chemical stability with the battery components. By coating the lithium anode with this composite coating layer, the lifetime of the battery can be enhanced. In one or more embodiments, the presence of the composite coating layer increases cycle life of the battery by, e.g., 40 or more cycles (as compared to a battery that does not include a composite coating layer). In one or more embodiments, the presence of the composite coating layer allows for the battery to exhibit discharge capacity of at least 80% after 100 cycles, after 120 cycles, after 130 cycles, after 140 or more cycles. In one or more embodiments, the presence of the composite coating layer allows for the battery to exhibit discharge capacity of at least 90% after 80 cycles, after 100 cycles, after 120 cycles, after 130 cycles, after 140 or more cycles.

Polymer

In one or more embodiments, the composite coating layer is a heterogeneous system including two or more materials as separate phases, at least one of which is a polymer. In one or more embodiments, the polymer component is utilized as either a binder material or as a hosting matrix so the fiber network can maintain the integrity and porosity needed for contact with the liquid electrolyte. The polymer component can also serve as a binder material or as a hosting matrix for particles, as discussed below.

In selecting a polymer for use in the composite coating layer, the polymer should demonstrate compatibility with the pairing fiber. For example, a casting suspension (the liquid to be cast to form the coating) is desirably stable so that the fiber and polymer form a dispersion that is sufficiently uniform (e.g., such that no apparent gradient in fiber distribution can be observed). In one or more embodiments, the fiber can be dispersed in solvent without settling down too quickly, such that the resulting composite coating layer does not show a gradient in the concentration of fibers. In one or more embodiments, in order to maintain good suspension, the dimensions of the fiber are selected to be small enough so that the fibers will not settle down too fast to allow for a reasonable pot life for the coating process. In one or more embodiments, the composite coating layer is homogeneous or substantially homogeneous.

In one or more embodiments, the fiber and polymer have a good wetting property to each other so they can be homogenized. In one or more embodiments, upon drying, the polymer has good adhesion to the fiber so that it can hold the fiber in place. In one or more embodiments, the polymer has good adhesion to the fiber such that there is no gap between the polymer and the fiber due to coating detachment.

In one or more embodiments, no specific mechanical property is required for the polymer, as the fiber component provides the needed modulus.

In one or more embodiments, the polymer is selected to be insoluble in the electrolyte to be used in the cell. In one or more embodiments, both gel forming polymers (with the electrolyte) and electrolyte insoluble polymers can be used.

In embodiments, in which the composite coating is non-porous or dense, the polymer can be ion conductive. In one or more embodiments, a composite coating is considered dense if it is impenetrable or substantially impenetrable by the liquid electrolyte. In one or more embodiments, the polymer fills any voids in the composite coating, forming a dense coating. In one or more embodiments where the polymer forms a dense coating, the polymer is selected to conduct Li ion. In one or more embodiments, the ionic conductivity of the polymer is greater than about $10^{-4}$ $Scm^{-1}$, greater than about $10^{-3}$ $Scm^{-1}$, greater than about $10^{-2}$ $Scm^{-1}$ or in the range of about $10^{0}$–$10^{-4}$ $Scm^{-1}$.

Exemplary and non-limiting polymer materials that may be used in the composite coating include commercially available polymers and polymers acquired by standard polymerization techniques such, as polycondensation or polyaddition. The architecture of the polymer chains of the polymer used in the composite coating can be linear, branched, or cross-linked. In one or more embodiments, the polymer can include, for example, poly(methyl methacrylate), poly(hexyl methacrylate), polystyrene, poly(tetrafluoroethylene), polyethylene glycol, polyacrylonitrile, poly(vinylpyridine), poly(lithium 2-acrylamido-2-methyl-1-propanesulfonate), aromatic polyamide, polyvinylpyrrolidone, poly(vinyl acetate) and poly(N-isopropylacrylamide), and any blends or copolymers thereof.

In one or more embodiments, the polymer can include, for example, Nylon (e.g., aliphatic or semi-aromatic polyamide) and KEVLAR® (e.g., synthetic aramid fiber).

Although the chemical nature of polymers is distinct from the chemical nature of ceramics, some polymers have exhibited compatibility with certain fibers. For example, polyimide resins are excellent matrices for glass fibers, which give rise to a high-performance composite material.

Fiber

In one or more embodiments, different kinds of fiber materials can be employed to engineer the composite coatings described herein. In one or more embodiments, the fiber materials are dispersed in the polymer matrix. In selecting a fiber for use in the composite coating, the fiber should demonstrate compatibility with the polymer.

In one or more embodiments, the fibers can be ceramic fibers. Exemplary ceramic fibers can include ceramic materials such as metal carbides, oxides, nitrides, and sulfites. In one or more embodiments, the fibers can be polymer fibers, such as Nylon (e.g., aliphatic or semi-aromatic polyamide), KEVLAR® (e.g., synthetic aramid fiber), etc. In one or more embodiments, the fibers can have a diameter in the range of about 1-100 nm, 100-1000 nm, 1000-5000 nm, including any subsets of these ranges. In one or more embodiments, the fibers can have a diameter in the range of about 1-10 nm, 5-20 nm, 10-30 nm, 25-50 nm, 30-60 nm, 40-75 nm, 50-80 nm, 60-90 nm, 75-100 nm, 80-120 nm, 90-125 nm, 100-150 nm, 125-175 nm, 150-200 nm, 175-250 nm, 190-275 nm, 200-300 nm, 250-350 nm, 300-400 nm, 350-450 nm, 400-500 nm, 450-550 nm, 500-600 nm, 550-650 nm, 600-700 nm, 650-750 nm, 700-800 nm, 750-850 nm, 800-900 nm, 850-950 nm, 925-1000 nm, 950-1050 nm, 1000-1250 nm, 1100-1400 nm, 1250-1500 nm, 1350-1600 nm, 1500-1750 nm, 1600-2000 nm, 1800-2250 nm, 2000-2500 nm, 2300-2750 nm, 2500-3000 nm, 2750-3500 nm, 3000-3750 nm, 3500-4250 nm, 4000-4750 nm, 4500-5000 nm. In one or more embodiments, the fibers can have a length in the nanometer range (e.g., about 1-1000 nm, e.g., about 1-50 nm, 25-75 nm, 60-100 nm, 50-250 nm, 75-175 nm, 100-500 nm, 250-600 nm, 500-750 nm, 600-800 nm, 750-900 nm, 850-1000 nm). In one or more embodiments, the length of the fibers can be in the micrometer range (e.g., about 1-1000 microns, e.g., about 1-3 microns, 1-10 microns, 5-20 microns, 10-30 microns, 25-50 microns, 35-75 microns, 50-100 microns, 75-150 microns, 125-200 microns, 175-275 microns, 250-400 microns, 300-500 microns, 450-700 microns, 500-800 microns, 650-900 microns, 750-950 microns, 800-1000 microns). In one or more embodiments, the fibers can have a length that is greater than about 1000 microns. In one or more embodiments, at least one dimension of the fiber (e.g., the diameter) is smaller than another dimension of the fiber (e.g., the length of the fiber).

In one or more embodiments, various amount of fiber, e.g., fiber load, can be used. In one or more embodiments, the fiber load of the composite coating is in the range of about 1% wt to 80% wt. In one or more embodiments, the fiber load of the composite coating is in the range of about 50% wt to 95% wt or about 50% wt to 80% wt. In one or more embodiments, the fiber load of the composite coating is in the range of about 1% wt to 5% wt, 1% wt to 10% wt, 5% wt to 13% wt, 10% wt to 20% wt, 15% wt to 25% wt, 20% wt to 35% wt, 25% wt to 40% wt, 30% wt to 50% wt, 40% wt to 50% wt, 45% wt to 60% wt, 55% wt to 70% wt, 65% wt to 80% wt, 75% wt to 85% wt, 80% wt to 95% wt.

In one or more embodiments, the use of fibers in the composite coating as described herein provides improvement over prior art composites, particularly prior art composites loaded with particles, because comparable results can be obtained with lower fiber loads (e.g., with fiber loads of 1% wt to 10% wt). In one or more embodiments, at least 1-10% wt particles are needed as compared to fibers to achieve acceptable results (e.g., acceptable battery life). In one or more embodiments, the fibers increase ionic conductivity of the layer, reducing impedance of the coating.

Particle

In one or more embodiments, particle reinforcement can be included in the composite coating. In one or more embodiments, nano-scale particles are used (e.g., particles having dimensions on the order of about 1-1000 nm, e.g., about 1-50 nm, 25-75 nm, 60-100 nm, 50-250 nm, 75-175 nm, 100-500 nm, 250-600 nm, 500-750 nm, 600-800 nm, 750-900 nm, 850-1000 nm). In one or more embodiments, micro-scale particles are used (e.g., particles having dimensions on the order of about 1-1000 microns, e.g., about 1-3 microns, 1-10 microns, 5-20 microns, 10-30 microns, 25-50 microns, 35-75 microns, 50-100 microns, 75-150 microns, 125-200 microns, 175-275 microns, 250-400 microns, 300-500 microns, 450-700 microns, 500-800 microns, 650-900 microns, 750-950 microns, 800-1000 microns). In one or more embodiments, a combination of nano-scale and micro-scale particles are used.

In one or more embodiments, micro-scale and/or nano-scale particles are used in the composite coating together with fibers as described above. In one or more embodiments, fibers and particles are dispersed in the polymer matrix.

In one or more embodiments, the diameter of the particles is similar to at least one dimension (e.g., length dimension) of the fiber. In one or more embodiments, the diameter of the particles is smaller than at least one dimension (e.g., length dimension) of the fiber. In one or more embodiments, the diameter of the particles may be between 1-1000 nm and at least one dimension of the fiber may be between 1-1000 microns.

In one or more embodiments, the particle load of the composite coating is less than the fiber load of the composite coating. In one or more embodiments, the particle load of the composite coating is larger than the fiber load of the composite coating. In one or more embodiments, the particle load of the composite coating is the same as the fiber load of the composite coating. In one or more embodiments, the particle load of the composite coating is in the range of about 1% wt to 5% wt, 1% wt to 10% wt, 5% wt to 13% wt, 10% wt to 20% wt, 15% wt to 25% wt, 20% wt to 35% wt, 25% wt to 40% wt, 30% wt to 50% wt, 40% wt to 50% wt, 45% wt to 60% wt, 55% wt to 70% wt, 65% wt to 80% wt, 75% wt to 85% wt, 80% wt to 95% wt.

Surface Conducting Groups

In one or more embodiments, the fiber and/or the particle surfaces can be chemically modified to change the hydrophobicity properties of the fiber and/or the particle surfaces such that the fibers or the particles are able to bear ion-conducting chemical species. In one or more embodiments, all the fibers are functionalized with the same functional group. In one or more embodiments, some fibers are functionalized and some fibers are not functionalized. In one or more embodiments, some fibers are functionalized with one kind of functional group and other fibers are functionalized with another kind of functional group. In one or more embodiments, particles are present in the polymer in addition to the fibers, where the particles may be functionalized. In one or more embodiments, the particles may be functionalized with the same or different functional group(s) as the fibers. In one or more embodiments, the particles are not functionalized, and the fibers are functionalized.

Several different chemical surface modification methodologies can be used, such as, but not limited to, treatments with oleic acid, adding polymer chains, including silane modification, and the like. In one or more embodiments, the fiber or particle surfaces can be modified by silane modification. Silane coupling agents can be used to enhance fiber/matrix adhesion in polymer composites. Alkoxysilanes and chlorosilanes contain groups that bind covalently with fibers through reaction with the hydroxyl groups on their surface.

Figure 3:
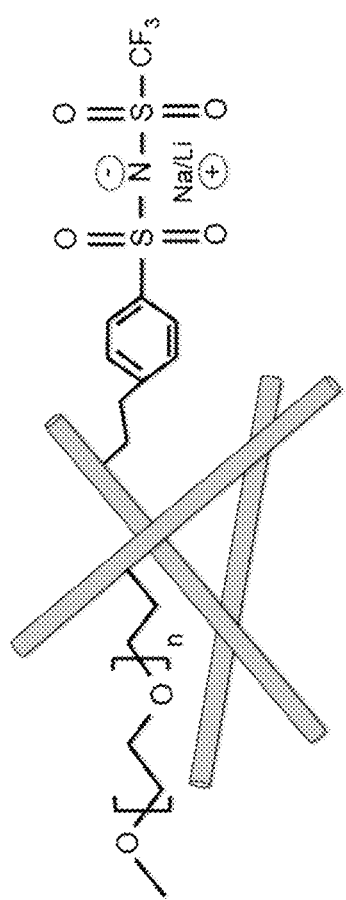
FIG. 3 is a schematic representation of surface-modified fibers bearing ion-conducting and anionic imide groups, according to some aspects of the present disclosure.

In one or more embodiments, silanes include anionic imide groups and/or polyethylene glycol strands that contribute to the lithium ion transport at the fiber/matrix interface. FIG. 3 is a schematic illustration of a fiber cluster that has been chemically modified to include these moieties. In one or more embodiments, the anion imide groups reduce ambipolar conductivity, which leads to undesirable accumulation of salt in the vicinity of lithium metal anode and, eventually, to an increase in polarization of the cell with a reduction in power capability. Generally, as the power capability (conductivity) is reduced, the capacity (and, at the same time, cycling current density) fades as well, resulting in a loss of cycle life. In one or more embodiments, silane modification thus 1: enhances ion-conducting character of the fiber's surface, making it more suitable for dispersion and adhesion in the corresponding ion-conducting polymer composite coating; and 2: reduces ambipolar conductivity.

In one or more embodiments, in order to prepare stable and compatible composite solution for coating, various solution preparation techniques can be used. In one or more embodiments, the preparation techniques may include high power, high shear mixing, homogenizing, and any powerful mixing techniques for creating a uniform slurry/suspension.

In one or more embodiments, various common coating techniques can be used to apply the composite coating layer. In one or more embodiments, spray coating, dip coating, roll to roll coating, and other techniques may be used to coat the composite coating layer onto the anode. In one or more embodiments, the composite coating layer forms a layer having a thickness in the range of about 100 nm to 100 μm, including, for example, about 100 nm to 500 nm, about 250 nm-750 nm, about 500 nm-800 nm, 750-1000 nm; about 850 nm-5 μm, about 1 μm to 10 μm, about 5 μm to 25 μm, about 15 μm to 40 μm, about 30 μm to 50 μm, about 40 μm to 75 μm, about 50 μm to 80 μm, about 60 μm to 90 μm, about 75 μm to 100 μm. In one or more embodiments, the coating forms a layer having a thickness of about 1 μm.

Salt

In one or more embodiments, the salt is soluble in the electrolyte. In one or more embodiments, the salt is or includes an imide salt. In one or more embodiments, the salt is or includes an imide salt with a fluorosulfonyl ($FSO_2$) group, e.g., lithium bisfluorosulfonylimide ($LiN(FSO_2)_2$ (LiFSI), $LiN(FSO_2)_2$, $LiN(FSO_2)(CF_3SO_2)$, $LiN(FSO_2)(C_2F_5SO_2)$.

Electrolyte

In one or more embodiments, the electrolyte is or includes a cyclic carbonate (e.g., ethylene carbonate (EC) or propylene carbonate, their derivatives, and any combinations or mixtures thereof). In one or more embodiments, the electrolyte is or includes a cyclic ether such as tetrahydrofuran (THF) or tetrahydropyran (THP), their derivatives, and any combinations and mixtures thereof. In one or more embodiments, the organic solvent is or includes a glyme such as dimethoxyethane (DME) or diethoxyethane, their derivatives, and any combinations and mixtures thereof. In one or more embodiments, the electrolyte is or includes an ether such as diethylether (DEE) or methylbutylether (MBE), their derivatives, and any combinations and mixtures thereof.

The invention is illustrated by the following examples, which are not intended to be limiting of the invention.

EXAMPLES

Example 1

Fiber Silanization

Silanes containing anionic imide groups were synthesized according to the procedure described by I. Villaluenga et al. in *J. Mat. Chem. A*, 2013, 1, 8348. Commercial silicon carbide nanofibers (SiC NFs, Nanostructured & Amorphous Materials Inc., USA) were dispersed in N,N-dimethyl formamide (DMF, Alfa Aesar), about 100 ml of the solvent per each g of SiC NFs, using homogenizer for 5 to 10 min. The dispersion was transferred into a Shlenk line flask and degassed under Ar for 0.5 h, followed by adding polyethylene glycol silane, 2-[methoxy(polyethyleneoxy)$_{9-12}$propyl]trimethoxysilane (Gelest) and/or imide silane dropwise, 1.5 g of each silane per 1 g of about 1 μm to 10 μm NFs. The reaction solution was heated to 125° C. for 12 h. The unreacted silane molecules and by-products were washed by repeated procedure of precipitation in methanol, centrifugation, and re-dispersion in DMF. The resulting powder was dried under vacuum at 60° C. for 24 h.

Example 2

Anode Coating Layer

One example of coating the anode is via dip coating (there are other methods that can be employed, this is only one of them and not to be considered limiting to the instant disclosure).

Lithium metal anodes were first cut to about 3 cm by about 5 cm rectangular pieces from as shipped condition. They were then taped and fixed onto plastic holders. The holders were only in contact with the anode in the edges, so the main area of the anodes was exposed to be coated. The holder and anodes were then dip coated using a standard dip coater at a travelling distance of 7 cm, travelling down speed of 200 mm/min, travelling up speed of 70 mm/min, and soaked for 5 seconds. The coated anode was then placed in a heated vacuum oven for drying overnight, the oven temperature was set at 65° C. After drying, the anode was removed from the holder, cut to desired size and shape, and was ready to be assembled to battery.

Example 3

Cell Assembly and Testing

Preliminary result (FIG. 4) of a composite coating with varying fiber loading (1%, 10%, 50%, 80%) showed the higher fiber composition in the composite coating layer has a positive effect on improving cycle life of the battery.

The fibers used in this example were silicon carbide fibers, with diameters between 0.1-2.5 μm and lengths between 2-50 μm. Pouch cells in 63450 form (rectangular pouch cells, where the cathode is 47 mm long and 31.4 mm wide, and the anode is 48 mm long and 32.4 mm wide, and the cathode and anode are stacked together to form the pouch cell) were assembled with commercial $LiCoO_2$ cathodes, lithium metal anodes (with coating on top of lithium) and commercially available microporous separators. Cycling tests were then performed for these cells on Arbin (Arbin Instruments, China) and Neware (Neware Battery Testing Instruments, China) testers. Cycling test procedures were 3 cycles of both charging and discharging at a constant current of C/10 (where C was the nominal capacity of the cell) followed by constant current C/2 charge and discharge cycles until discharge capacity dropped to 80% of the initial discharge capacity. Cut-off voltages may vary in cases of different cathodes.

Figure 4:
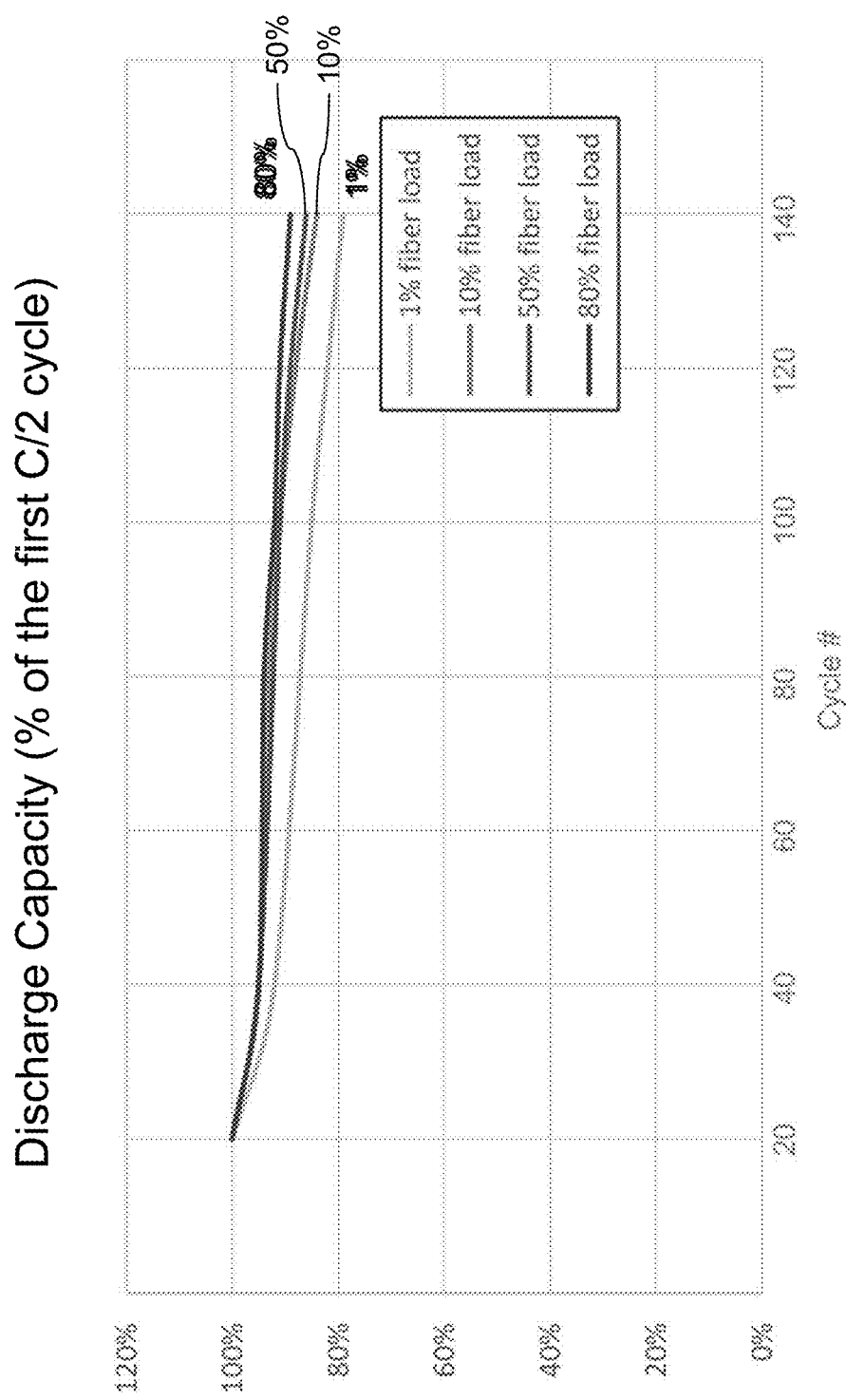
FIG. 4 is a plot of discharge capacity versus testing cycle number of batteries made with varying fiber load from 1% to 80% by weight, according to some aspects of the present disclosure.

As seen in FIG. 4, the cell with the composite coating layer loaded with 1% fiber dropped to 80% of the initial discharge capacity faster than the composite coating layer loaded with 10% fiber. However, the composite coating layer loaded with 1% fiber did not drop to 80% of the initial discharge capacity until about 135 cycles, which is a significant improvement over systems not including the composite coating layer. Further, as seen in FIG. 4, the discharge capacity decreased somewhat faster for the cell with the composite layer loaded with 10% fiber than for the cell with the composite layer loaded with 50% fiber or 80% fiber. However, the performance of the cell including the composite coating layer loaded with 10% fiber was comparable to the cells with the composite coating layer loaded with 50% or 80% fiber, which demonstrates that low fiber loading (e.g., 10% or less) is sufficient to provide desired battery performance. As shown in FIG. 4, the discharge capacity for the cells including the composite coating layers loaded with 10%, 50%, and 80% fiber was above 80% of the initial discharge capacity after 140 cycles.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can represent either by weight or by volume.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments. Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise.

It will be appreciated that while a particular sequence of steps has been shown and described for purposes of explanation, the sequence may be varied in certain respects, or the steps may be combined, while still obtaining the desired configuration. Additionally, modifications to the disclosed embodiment and the invention as claimed are possible and within the scope of this disclosed invention.

Throughout the description, where articles, devices, and systems are described as having, including, or comprising specific components, or where processes and methods are described as having, including, or comprising specific steps, it is contemplated that, additionally, there are articles, devices, and systems of the present invention that consist essentially of, or consist of, the recited components, and that there are processes and methods according to the present invention that consist essentially of, or consist of, the recited processing steps.

The mention herein of any publication, for example, in the Background section, is not an admission that the publication serves as prior art with respect to any of the claims presented herein. The Background section is presented for purposes of clarity and is not meant as a description of prior art with respect to any claim.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A lithium metal anode for a battery that includes a cathode and an electrolyte disposed between the cathode and the lithium metal anode, the lithium metal anode comprising:
   a current collector; and
   a composite coating disposed over the current collector, and a lithium metal layer disposed between the current collector and the composite coating, the composite coating comprising a mixture of a polymer and reinforcing fibers, wherein the reinforcing fibers have a diameter in a range of 600 nm to 5000 nm and are dispersed in a matrix of the polymer, the reinforcing fibers are configured and provided to the matrix so as to reinforce and strengthen mechanical integrity of the composite coating, and the composite coating is in contact with the electrolyte when the battery is fully assembled;

wherein the composite coating is designed and configured to prevent penetration of dendrites formed on the lithium-metal mode through the composite coating.

2. The lithium metal anode of claim 1, wherein the polymer comprises a lithium ion conducting polymer.

3. The lithium metal anode of claim 1, wherein the polymer comprises a binder.

4. The lithium metal anode of claim 1, wherein the polymer is selected from the group consisting of poly (methyl methacrylate), poly(hexyl methacrylate), polystyrene, poly(tetrafluoroethylene), polyethylene glycol, polyacrylonitrile, poly(vinylpyridine) or poly(lithium 2-acrylamido-2-methyl-1-propanesulfonate), aromatic polyamide, polyvinylpyrrolidone, poly(vinyl acetate) and poly (N-isopropylacrylamide), and any blends or copolymers thereof.

5. The lithium metal anode of claim 1, wherein the current collector comprises a copper layer.

6. The lithium metal anode of claim 1, wherein the fibers are selected from the group consisting of ceramic fibers, organic fibers, lithium-based fibers and mixtures thereof.

7. The lithium metal anode of claim 1, wherein the fibers have a length in the range of 1-100 nm, or 100-1000 nm, or 1000-5000 nm.

8. The lithium metal anode of claim 1, wherein the fiber load of the composite is in the range of 1% wt to 99% wt.

9. The lithium metal anode of claim 1, wherein the fiber load of the composite is in the range of 1% wt to 10% wt.

10. The lithium metal anode of claim 1, wherein the fibers are inorganic.

11. The lithium metal anode of claim 1, wherein the fibers are chemically functionalized.

12. The lithium metal anode of claim 11, wherein the functionality is selected to impart lithium ion transport functionality to the fiber.

13. The lithium metal anode of claim 11, wherein the functionality comprises an imide anion.

14. The lithium metal anode of claim 11, wherein the functionality comprises a polyalkoxy moiety.

15. The lithium metal anode of claim 1, wherein the composite coating further comprises a reinforcing nanoparticle component.

16. The lithium metal anode of claim 1, wherein the composite coating is porous.

17. The lithium metal anode of claim 16, wherein an average pore size is between 25 nm and 500 nm.

18. The lithium metal anode of claim 16, wherein an average pore size is less than 25 nm.

19. The lithium metal anode of claim 1, wherein the composite coating is non-porous.

20. The lithium metal anode of claim 19, wherein the composite coating has a roughness on the order of 0.2 p.m.

21. The lithium metal anode of claim 19, wherein at least one of the polymer and the fiber is ionically conductive.

22. The lithium metal anode of claim 1, wherein the composite coating has a thickness and pores having a tortuosity, and the composite coating is designed and configured to prevent penetration of dendrites formed on the lithium-metal anode through the composite coating by virtue of the thickness or the tortuosity of the pores, or both.

23. The lithium metal anode of claim 1, wherein the composite coating is prepared as a suspension solution composed of the reinforcing fibers as loose fibers dispersed in the polymer, and the composite coating is made by applying the suspension solution over the current collector.

24. The lithium metal anode of claim 1, wherein the composite coating has a thickness, and the reinforcing fibers are dispersed throughout the entirety of the thickness.

25. A lithium ion battery, comprising:
a cathode,
a lithium metal anode, according to claim 1; and
a liquid electrolyte.

26. The battery of claim 25, wherein the battery further comprises a porous separator soaked with the liquid electrolyte, wherein the cathode and the anode are held apart by the porous separator soaked with the liquid electrolyte, and the porous separator prevents electrical contact between the cathode and the anode while allowing ion conduction between the cathode and the anode.

* * * * *

UNITED STATES PATENT AND TRADEMARK OFFICE
CERTIFICATE OF CORRECTION

PATENT NO. : 11,177,470 B2
APPLICATION NO. : 15/085421
DATED : November 16, 2021
INVENTOR(S) : Qichao Hu et al.

Page 1 of 1

It is certified that error appears in the above-identified patent and that said Letters Patent is hereby corrected as shown below:

In the Claims

In Column 17, Line 14, Claim 1, the word "mode" should be replaced with the word "anode".

Signed and Sealed this
Fifth Day of April, 2022

Drew Hirshfeld
*Performing the Functions and Duties of the
Under Secretary of Commerce for Intellectual Property and
Director of the United States Patent and Trademark Office*